United States Patent [19]

Lange et al.

[11] Patent Number: 4,572,468
[45] Date of Patent: Feb. 25, 1986

[54] SEATS

[75] Inventors: Dieter Lange, Petershagen; Bernd Deptolla, Niedernwöhren, both of Fed. Rep. of Germany

[73] Assignee: P. A. Rentrop Hubbert & Wagner Fahrzeugausstattungen GmbH & Co. KG, Stadthagen, Fed. Rep. of Germany

[21] Appl. No.: 506,825

[22] Filed: Jun. 22, 1983

[30] Foreign Application Priority Data

Jun. 23, 1982 [DE] Fed. Rep. of Germany ....... 3223380

[51] Int. Cl.⁴ ............................................. A45D 19/04
[52] U.S. Cl. .................................... 248/394; 297/325
[58] Field of Search ............... 248/394, 395, 393, 396; 297/330, 325, 329, 316, 346; 74/436

[56] References Cited

U.S. PATENT DOCUMENTS

| 442,404 | 12/1890 | Steiger | 74/436 |
|---|---|---|---|
| 2,161,367 | 6/1939 | McGregor et al. | 248/394 |
| 4,190,225 | 2/1980 | Bauer et al. | 248/394 |
| 4,325,527 | 4/1982 | Berneking | 248/396 |
| 4,406,497 | 9/1983 | Kluting | 297/325 X |
| 4,487,390 | 12/1984 | Miyashita | 248/396 |

FOREIGN PATENT DOCUMENTS

| 2306535 | 8/1974 | Fed. Rep. of Germany | 248/393 |
|---|---|---|---|
| 2713693 | 10/1978 | Fed. Rep. of Germany | 248/393 |
| 2734552 | 2/1979 | Fed. Rep. of Germany | 248/393 |
| 2856937 | 4/1980 | Fed. Rep. of Germany | 248/393 |

Primary Examiner—J. Franklin Foss
Attorney, Agent, or Firm—Penrose Lucas Albright

[57] ABSTRACT

A seat includes a device for adjusting the position of a seat part relative to its support. The device is operated by a rotary knob which rotates a pinned disc of a lantern wheel gearing arrangement. The pins of the disc cooperate with teeth of a gear wheel which is connected to a pinion that rolls on a toothed segment articulated to the seat support. The teeth of the gear wheel are constructed so that reaction forces due to contact between the flanks and the pins are directed so as to pass through the rotational axis of the disc. Therefore no torque is applied to the disc and it remains stable.

7 Claims, 8 Drawing Figures 4,572,468

SEATS

BACKGROUND OF THE INVENTION

Technical Field

The present invention relates to a seat, particularly a motor vehicle seat, having a device for adjusting the position of a seat or back rest part relative to a seat or back rest support in a stepwise manner, which device is adjustable by means of an element actuated by a rotary knob.

SUMMARY OF THE INVENTION

The object of the invention is so to construct a seat of this type wherein it is possible to achieve a stepwise variation of the position of the seat part even during the journey, self-locking always being assured at the end of the corresponding adjustment stage, so ruling out any possibility of an unstable situation, which might give rise to unintentional operation of the device.

The present invention provides a seat including a seat or back rest support, a seat or back rest part, and a device for adjusting the position of said part relative to said support in a stepwise manner, said device including a rotary knob, a disc carrying a plurality of transversely extending pins and coupled to said knob for rotation therewith about an axis, and a gear wheel having teeth defined by flanks, which teeth are co-operable with said pins and are defined within an outer peripheral envelope, said flanks of the teeth which adjoin said outer envelope being constructed such that reaction forces due to contact between said flanks and said pins are directed so as to pass through said disc axis.

The arrangement of the pinned disc and co-operating gear wheel is referred to hereinafter as lantern wheel gearing.

DESCRIPTION OF A PREFERRED EMBODIMENT

Figure 1:
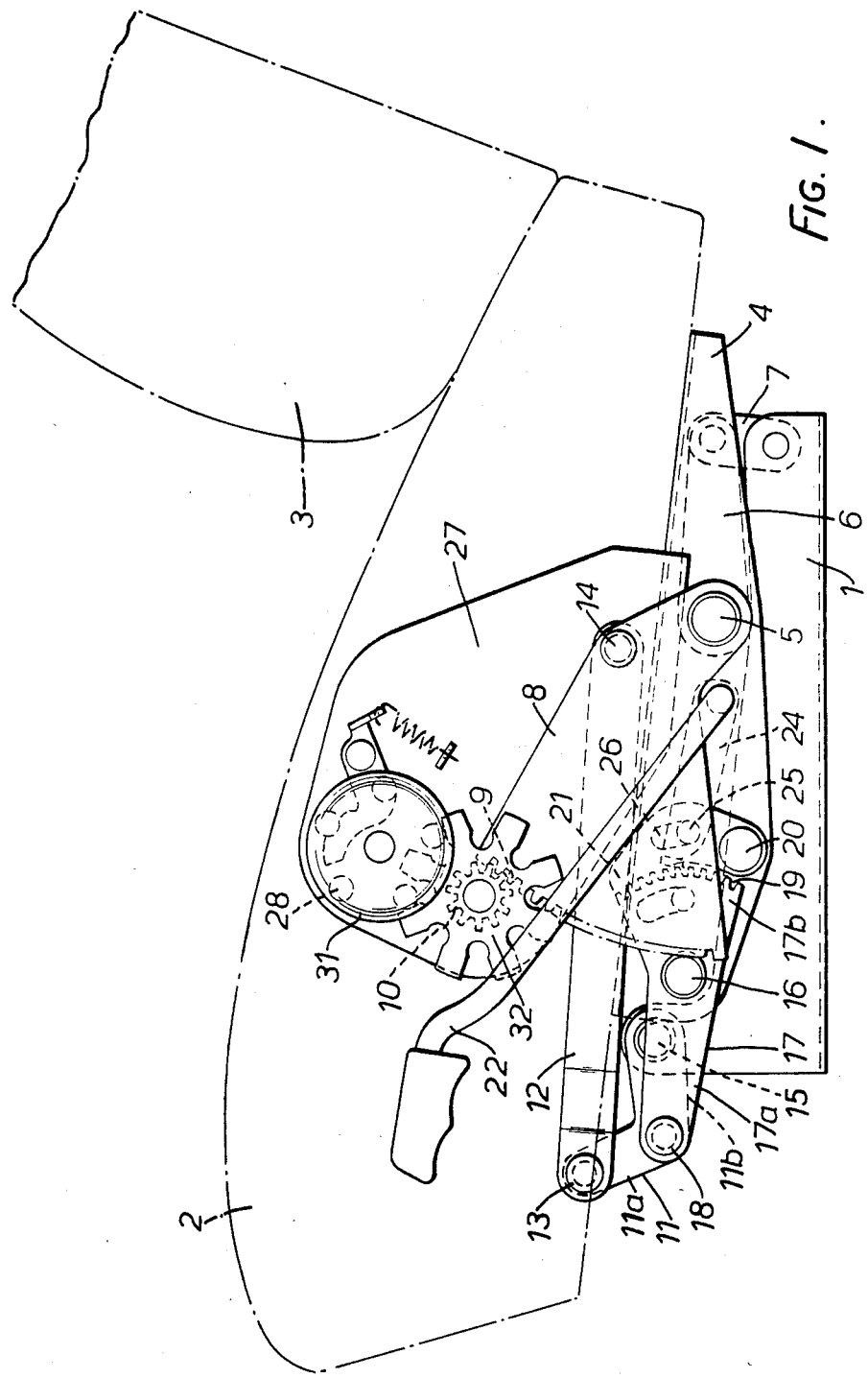
FIG. 1 is a side elevation of a seat according to the invention.

Reference numeral 1 (FIGS. 1 and 2) denotes a seat support which, in the case of the embodiment shown, consists of two parallel and spaced-apart profile members. Reference numerals 2 and 3 denote the seat part and seat back rest respectively. The seat support 1 is connected to the floor of the vehicle. Connected to the seat part 2 is a bottom frame 4 which consists of profile members.

Rotatably mounted in the bottom frame 4 is a rear transverse shaft 5 to which are connected respective links 6, each of which is articulated on the seat support 1. Between each link 6 and the seat support 1 there is a hinge plate 7.

Rigidly connected to one end of the rear transverse shaft 5 is a toothed segment 8, the row of teeth 9 of which mesh with a pinion 10.

In the case of the embodiment shown in the drawings, there is disposed in the front zone of the seat part 2 an angled two-arm lever 11, of which the two arms are designated 11a and 11b. The arm 11a of this angled lever 11 is articulated on the toothed segment 8 via a longitudinal rod 12, the joints being identified by reference numerals 13 and 14. The other arm 11b of the angled lever 11 is rigidly connected to a front transverse shaft 15 which is rotatably mounted in the seat support 1.

Connected to a central transverse shaft 16 rotatably mounted in the bottom frame 4 of the seat part 2 is a lever arrangement 17 of which the drawing only shows a further two-armed lever. The two arms of the further two-armed lever are indicated by reference numerals 17a and 17b. The oppositely disposed single-armed lever of the arrangement 17 has the shape which is designated by reference numeral 17a. The end of arm 17a is articulated on the apex of the angled lever 11, the articulation being designated 18.

The other lever arm 17b carries on its end a further toothed segment 19 which is engaged in a locked position by a toothed pawl 21 pivotally mounted at 20 in the bottom frame 4 of the seat part 2. The toothed pawl 21 can be moved into a released position via a pivot lever 22. This pivot lever 22 is rotatably mounted in the bottom frame 4 via a cranked part 23. Mounted on this cranked part 23 is a connecting lever 24 on one end of which there is a pin 25 which engages into a slot-like recess 26 defined in the toothed pawl 21.

The toothed pawl 21 is subject to the action of a restoring element e.g. a spring, not shown for the sake of clarity but which, when the pivot lever 22 is released, moves the toothed pawl 21 into the locked position in which the teeth of the two parts 19 and 21 become engaged.

Reference numeral 27 denotes a bearing mounting which is connected to the bottom frame 4. The mounting 27 carries a lantern wheel gearing, the details of which are shown particularly in FIGS. 3 and 4. This lantern wheel gearing consists of a disc 29 carrying pins 28 and connected by a shaft 30 to a rotary knob 31.

Figure 3:
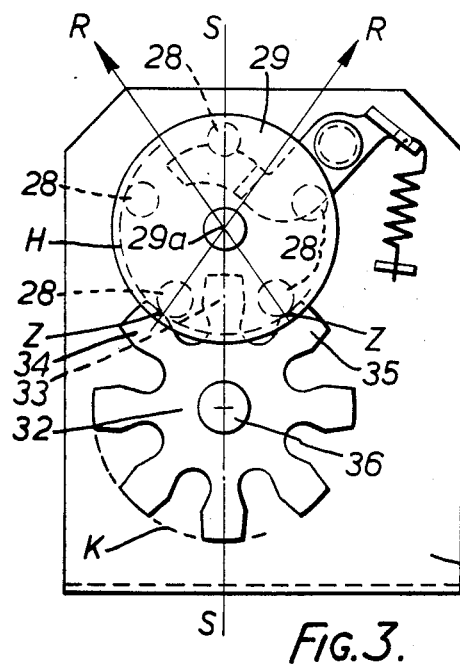
FIG. 3 is a view of the lantern wheel gearing for the seat adjusting device of the seat of FIG. 1.
Figure 4:
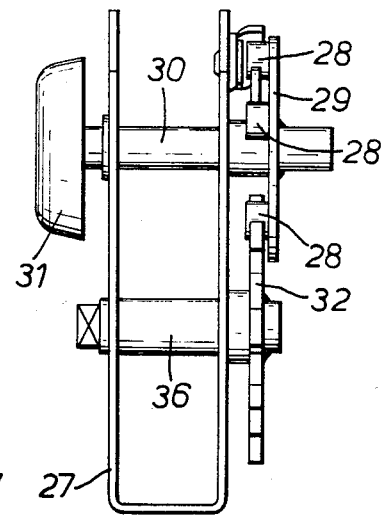
FIG. 4 is a side view of the arrangement shown in FIG. 4.

Associated with this disc 29, with the pins 28 disposed thereon, is a gear wheel 32, one tooth 33 of which is disposed behind the disc 29 and is shown by broken lines in FIG. 3. The teeth immediately adjacent on either side of this tooth 33 are designated 34 and 35.

The gear wheel 32 of the lantern wheel gearing is mounted in the support 27 via an arbor 36 which is connected to the pinion 10 (FIG. 1) which meshes with the row of teeth 9 on the toothed segment 8.

As FIG. 3 of the drawings shows, the flanks z of the teeth which adjoin the outer peripheral envelope circle k of the gear wheel 32 are so constructed that in a position in which the line of symmetry s—s of the tooth 33 passes through the axis of rotation 29a of the disc 29, the mutually facing tooth flanks z of the teeth 34,35 immediately adjacent the tooth 33 lie on an outer envelope circle h which touches the pins 28. By the choice of this particular geometry, a stable situation is guaranteed at the end of each stage of the rotary movement of the gearing for the seat adjusting device in that the reaction forces R (FIG. 3) arising due to the contact of the tooth flanks z and pins 28 pass through the axis of rotation 29a of the disc 29 and cannot therefore exert any torque on the disc 29.

The most general thought underlying this particular geometry relates to the fact that the flanks of the teeth are so constructed that the reaction force R on the lines of contact of the tooth flanks z of the teeth 34,35 and of the pins 28 pass through the axis of rotation 29a of the disc 29.

The described seat operates in the following way: First of all, it must be remarked quite generally that the lantern wheel gearing described can be used as an essential element of the adjusting device both for the seat part and also for the back rest. It is intended hereinafter, as an example, to describe in greater detail only its use in conjunction with adjustment of the seat part.

Figure 5:
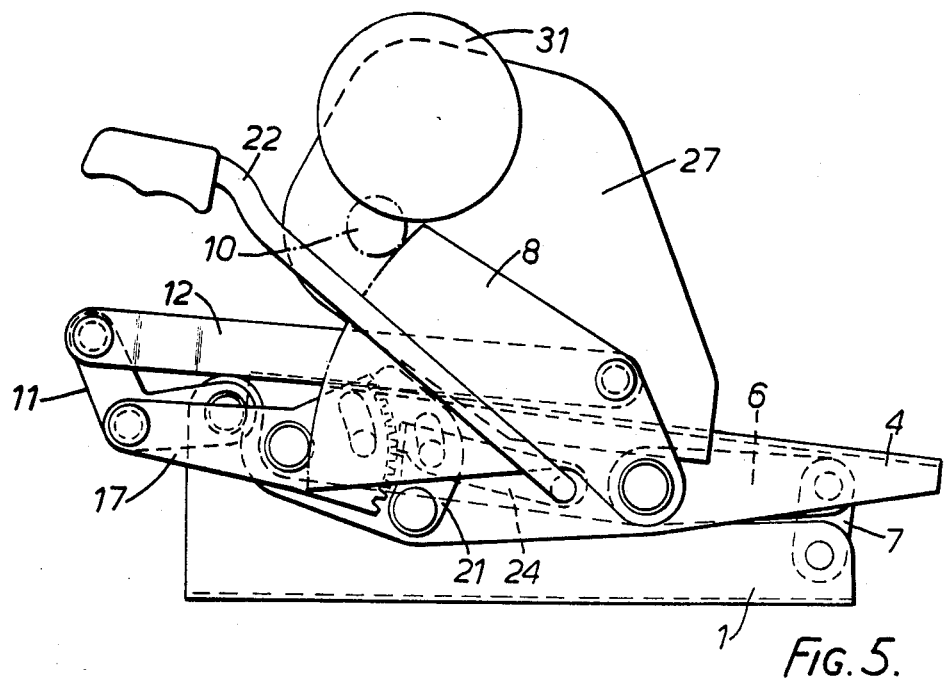
FIGS. 5 to 8 are side views of the seat, in various working positions, the seat part and the back rest having been omitted for reasons of clarity.

The description commences with reference to FIG. 5 of the drawings in which the seat part 2 is in its lowest position. If it is intended to adjust the height of the seat part 2, then actuation of the rotary knob 31 causes the pinion 10 to perform a rotary motion via the lantern wheel gearing with the result that by virtue of its engagement with the row of teeth 9 of the toothed segment 8, the latter is pivoted in a clockwise direction as viewed in FIG. 5. This can occur while the vehicle is travelling, a stable situation as shown in FIG. 3 being established at the end of each stage of adjustment. Once this stable condition is departed from due to further rotation of the rotary knob 31, then for example a brake connected to the disc 29 can ensure that no unintended adjustment can occur as a result of the loading on the seat part 2. In the extreme position, the individual parts assume the position shown in FIG. 6 of the drawings.

Figure 2:
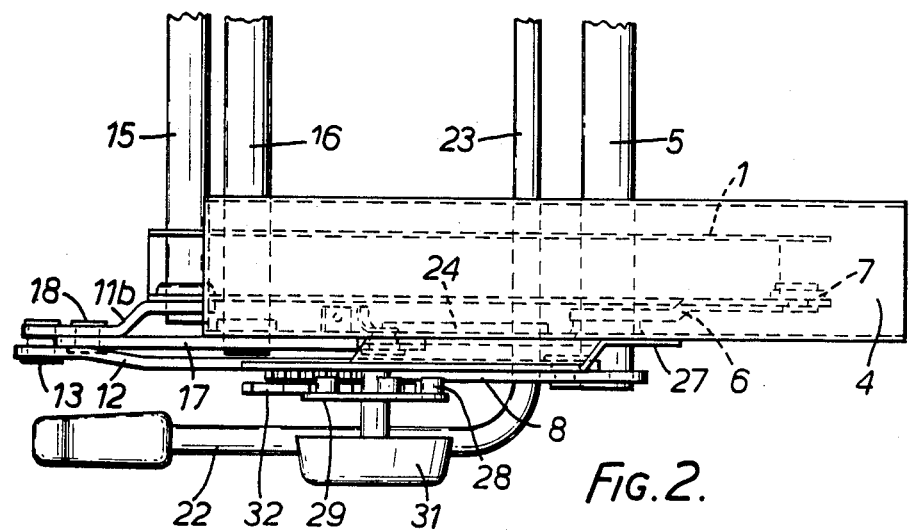
FIG. 2 is a partial plan view of the arrangement shown in FIG. 1, the seat part and the back rest not being shown for reasons of clarity.
Figure 7:
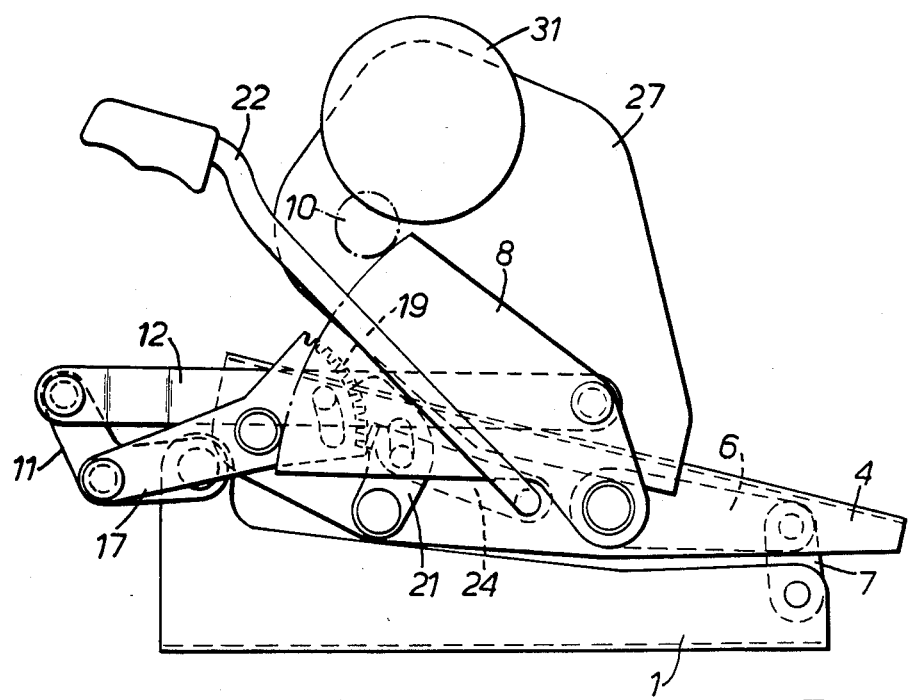

FIG. 7 shows a position in which only the front edge of the seat part 2 is raised. The starting point for this adjustment is the position of the individual parts as shown in FIGS. 1 and 5. If the pivot lever 22 is rotated in a clockwise direction, then the toothed pawl 21 moves against the springs loading it and into the released position in which, therefore, there is no engagement with the corresponding further toothed segment 19. If the user of the seat part 2 now shifts his weight to the rear, in other words in the direction of the back rest 3, then the individual parts of the adjustment device move into the position shown in FIG. 7, the pivot lever 22 being released again when the desired position is reached with the result that the toothed pawl 21 is returned to the locking position.

Figure 6:
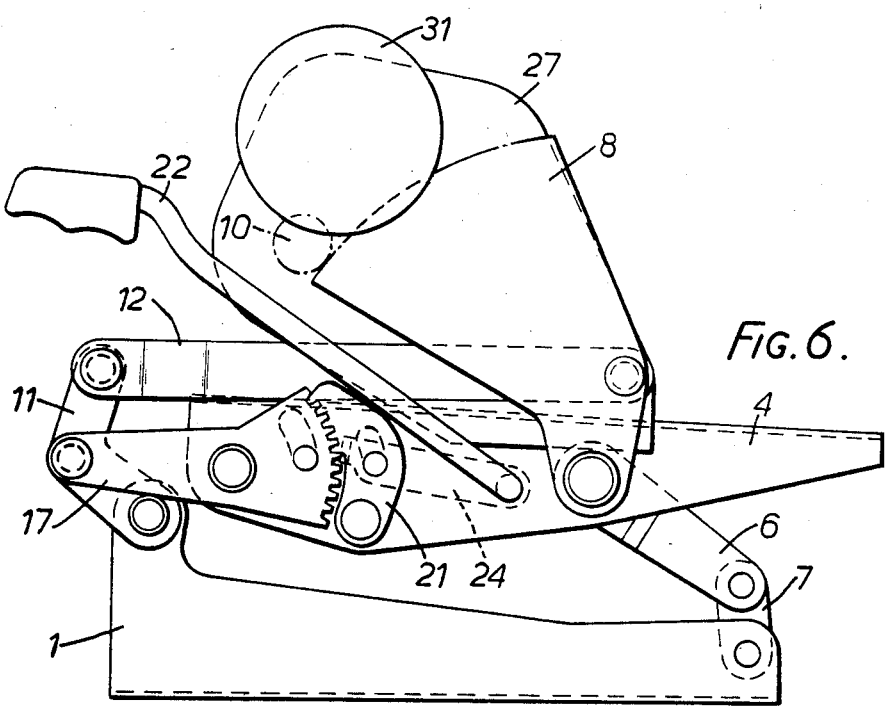
Figure 8:
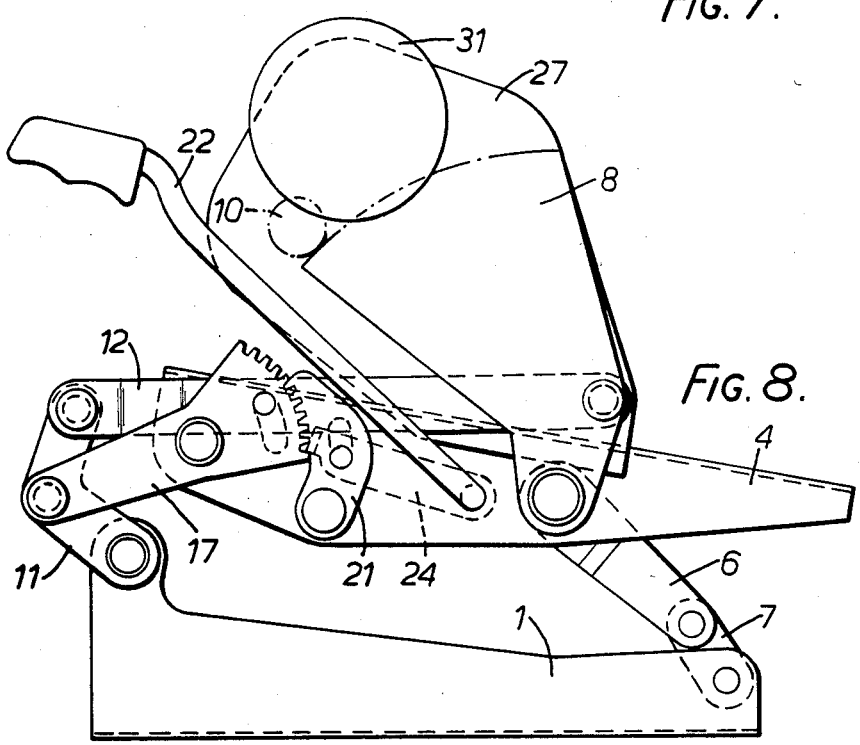

FIG. 8 of the drawings shows a kind of combination of the positions of the seat part according to FIGS. 6 and 7. In this case, therefore, both the rotary knob 31 and also the pivot lever 22 have to be actuated.

It will be appreciated that the special geometry of the individual parts of the described lantern wheel gearing, ensures that when the specific adjustment stage of the device for positioning the seat part is completed, a self-locking function is always guaranteed. Furthermore, the above described adjustable seat is characterised by ease of movement.

What we claim is:
1. A seat including
   a seat or back rest support,
   a seat or back rest part,
   a bottom frame connected to said part, and
   a device for adjusting the position of said part relative to said support in a stepwise manner, said device including
   a rotary knob,
   a disc carrying a plurality of transversely extending pins and coupled to said knob for rotation therewith about an axis,
   a gear wheel having teeth defined by flanks, which teeth are co-operable with said pins and are defined within an outer peripheral envelope, said flanks of the teeth which adjoin said outer envelope being constructed such that reaction forces due to contact between said flanks and said pins are directed so as to pass through said disc axis,
   a pinion connected to said gear wheel,
   a toothed segment in engagement with said pinion,
   a rear transverse shaft rotatably mounted in said bottom frame and connected to said toothed segment,
   an angled two-arm lever,
   a longitudinal rod having two ends, one end of which is articulated on said toothed segment while the other end is articulated on one arm of said angled lever,
   a front transverse shaft rotatably mounted in said suport and connected to the other arm of said angled lever, and
   respective link connected to said rear transverse shaft, each of which is articulated on said support.

2. A seat according to claim 1, in which said flanks of the teeth are so constructed that in a position of said device in which the line of symmetry of one tooth passes through said disc axis, said facing flanks of the teeth immediately adjacent said one tooth lie on an outer envelope circle which touches each of said pins.

3. A seat according to claim 1, further including a hinge plate disposed between each said link and said seat support.

4. A seat according to claim 1, further including a bearing carrying said disc and gear wheel connected to said bottom frame.

5. A seat according to claim 1, further including a central transverse shaft rotatably mounted in said bottom frame
   a further two-armed lever, one end of which is articulated on an apex of said angled lever,
   a further toothed segment carried on the other end of said further lever,
   a toothed pawl pivotally mounted in said bottom frame of said seat part which engages with said further toothed segment in a locked position, and
   a pivot lever for moving said toothed pawl into a released position.

6. A seat according to claim 5, further including a cranked part for rotatably mounting said pivot lever in said bottom frame, a connecting lever having two ends disposed on said cranked part,
   a slot-shaped recess defined in said toothed pawl, and
   a pin on one end of said connecting lever which engages in said slot-shaped recess.

7. A seat according to claim 6, further including a restoring element for acting on said toothed pawl such that when said pivot lever is released, the toothed pawl moves into said locked position.

* * * * *